US008646749B2

(12) United States Patent
Reiter

(10) Patent No.: US 8,646,749 B2
(45) Date of Patent: Feb. 11, 2014

(54) ELECTROMAGNETICALLY ACTUATABLE VALVE

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 703 days.

(21) Appl. No.: 12/734,204

(22) PCT Filed: Sep. 26, 2008

(86) PCT No.: PCT/EP2008/062923
§ 371 (c)(1),
(2), (4) Date: Aug. 20, 2010

(87) PCT Pub. No.: WO2009/053211
PCT Pub. Date: Apr. 30, 2009

(65) Prior Publication Data

US 2010/0301247 A1 Dec. 2, 2010

(30) Foreign Application Priority Data

Oct. 24, 2007 (DE) ........................ 10 2007 050 819

(51) Int. Cl.
*F16K 31/02* (2006.01)

(52) U.S. Cl.
USPC ................. 251/129.21; 251/129.15; 251/337; 239/585.3; 239/585.4; 239/900

(58) Field of Classification Search
USPC .......... 251/129.01, 129.15, 129.21, 337, 321; 239/585.1–585.5, 900
See application file for complete search history.

(56) References Cited

U.S. PATENT DOCUMENTS

| | | | | |
|---|---|---|---|---|
| 2,587,538 | A * | 2/1952 | Seaman | 251/129.18 |
| 4,655,396 | A * | 4/1987 | Taxon et al. | 239/585.3 |
| 4,984,744 | A * | 1/1991 | Babitzka et al. | 239/585.4 |
| 5,054,691 | A * | 10/1991 | Huang et al. | 239/585.3 |
| 5,255,855 | A | 10/1993 | Maier et al. | |
| 5,277,400 | A * | 1/1994 | Bierther | 251/129.18 |
| 5,934,572 | A * | 8/1999 | Hofmann et al. | 239/533.9 |
| 6,012,701 | A * | 1/2000 | Reiter | 251/129.21 |
| 6,015,103 | A * | 1/2000 | Kotkowicz | 239/585.4 |
| 6,328,231 | B1 | 12/2001 | Ording et al. | |
| 6,564,828 | B1 * | 5/2003 | Ishida | 137/515.5 |
| 6,776,401 | B2 * | 8/2004 | Krickau et al. | 267/167 |
| 2008/0061171 | A1 * | 3/2008 | Bayer | 239/585.3 |

FOREIGN PATENT DOCUMENTS

| | | |
|---|---|---|
| DE | 41 37 994 | 5/1993 |
| DE | 195 03 820 | 8/1996 |
| DE | 100 51 016 | 4/2002 |
| JP | 2006-242148 | 9/2006 |
| JP | 2006-528302 | 12/2006 |
| WO | WO 2006/015897 | 2/2006 |

* cited by examiner

*Primary Examiner* — John K Fristoe, Jr.
*Assistant Examiner* — Marina Tietjen
(74) *Attorney, Agent, or Firm* — Kenyon & Kenyon LLP

(57) ABSTRACT

An electromagnetically actuatable valve, e.g., a fuel injector for fuel injection systems, includes an electromagnetic actuating element having a solenoid, a fixed core, a valve jacket, and a movable armature for actuating a valve closing body, which cooperates with a valve seat surface provided on a valve seat body. In addition, the valve has a restoring spring for resetting the valve closing body to its resting position on the valve seat surface. The restoring spring and an internal longitudinal bore hole of the armature are paired in such a way that the armature is guided during its axial movement only along the restoring spring.

9 Claims, 3 Drawing Sheets

ELECTROMAGNETICALLY ACTUATABLE VALVE

BACKGROUND OF THE INVENTION

1. Field of the Invention

The present invention relates to an electromagnetically actuatable valve.

2. Description of Related Art

FIGS. 1 and 2 show a known electromagnetically actuatable valve in the form of a fuel injector from the related art, which has a typical design of a circumferential guide band at the outer periphery of a movable armature. During its axial movement, the armature, together with its guide band, slides in the inner opening of a valve sleeve along its internal wall, which is guided within the valve sleeve so that tripping or tilting of the armature is prevented.

Additional variants of guiding a movable armature of an electromagnetically operated fuel injector are also known. For example, published German patent document DE 41 37 994 A1 describes an at least partially circumferential guide lug which may be impressed in a nozzle carrier, this guide lug also being responsible for guiding the armature on its outer periphery. It is also known to provide guide lugs distributed over the periphery in the area of a magnetic restriction of an elongated valve body which guide the armature during its axial movement (see, e.g., published German patent document DE 195 03 820 A1). Published German patent document DE 100 51 016 A1 describes a fuel injector in which guide band segments located in the area of the strongest radial magnetic flux are formed on the outer periphery of the armature.

BRIEF SUMMARY OF THE INVENTION

The electromagnetically actuatable valve according to the present invention has the advantage of a compact design. The valve may be manufactured in a particularly cost-effective way since the armature guide is implemented in a simple and cost-effective manner. According to the present invention, a restoring spring and an internal longitudinal bore hole of the armature are paired in such a way that the armature is guided during its axial movement only along the restoring spring. In addition to its actual function of restoring the valve needle, the restoring spring also assumes the function of guiding the armature, thus implementing an integration of functions in a simple manner. The contact surface used for guiding is advantageously reduced compared to the approaches of the related art. The function is improved by avoiding undesirable radial forces due to the unguided outer periphery of the armature.

It is advantageous in particular to bring the longitudinal bore hole of the armature and optionally the flow bore hole of the internal pole to their exact internal dimensions by reaming.

It is advantageous to provide flats on the periphery of the restoring spring along which the armature is guided and which are formed over the entire length or portion of the length of the restoring spring.

DETAILED DESCRIPTION OF THE INVENTION

Figure 1:
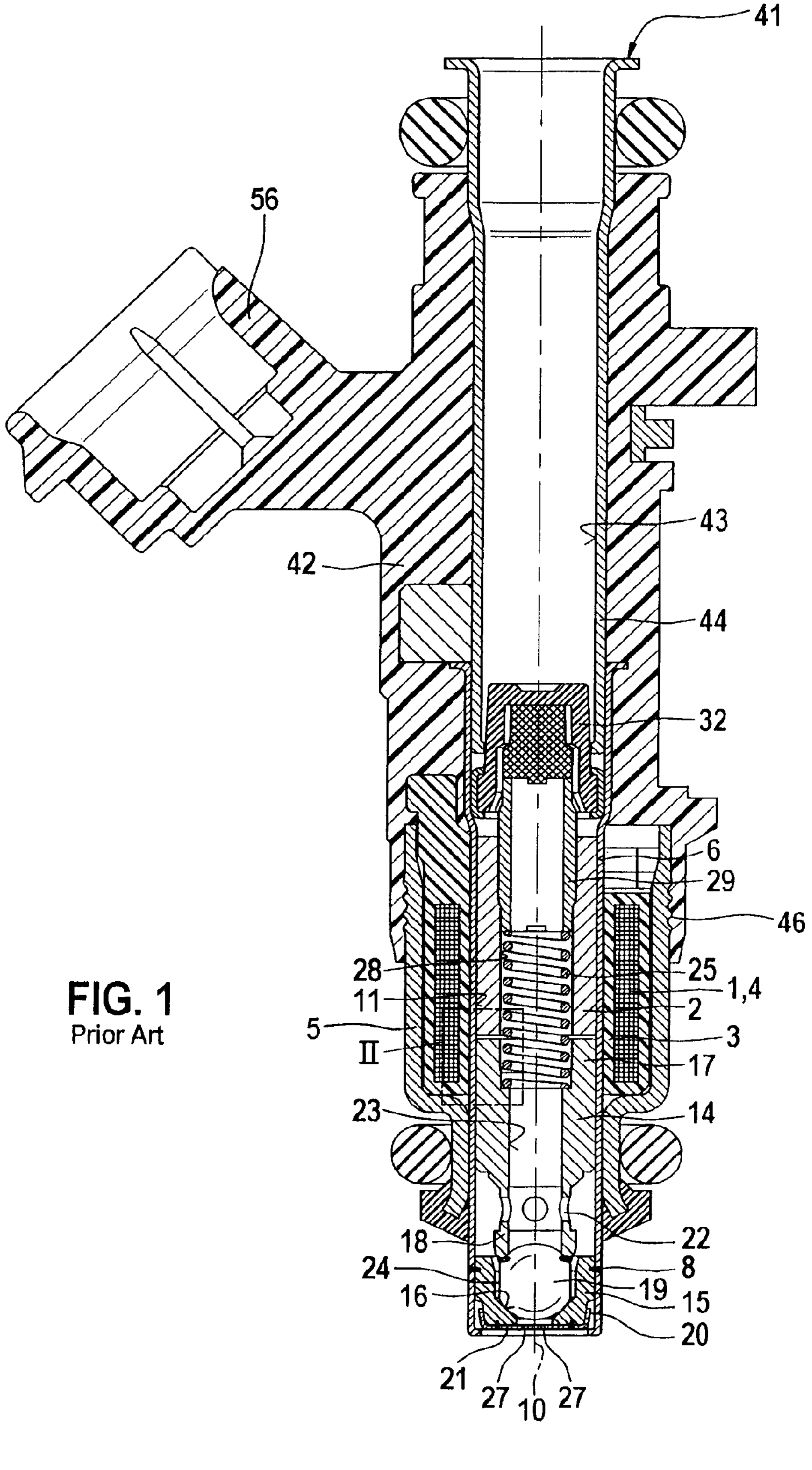
FIG. 1 Prior Art
FIG. 1 shows an electromagnetically actuatable valve in the form of a fuel injector according to the related art.

FIG. 1 shows, as an example, an electromagnetically actuatable valve in the form of a fuel injector for fuel injection systems of mixture-compressing internal combustion engines having externally supplied ignition according to the related art for better understanding of the present invention.

The valve has a largely tubular core 2, surrounded by a solenoid 1 and used as an internal pole and partially as a fuel passage. Solenoid 1 is fully surrounded in the peripheral direction by an outer, sleeve-shaped, stepped, for example ferromagnetic, valve jacket 5, which represents an external magnetic circuit component used as an external pole. Solenoid 1, core 2, and valve jacket 5 together form an electrically excitable actuating element.

While solenoid 1 embedded in a bobbin 3 externally surrounds a valve sleeve 6 with a winding 4, core 2 is introduced in an internal opening 11 of valve sleeve 6 running concentrically to a longitudinal valve axis 10. Valve sleeve 6 has an elongated and thin-walled design. Opening 11 is used, among other things, as a guide opening for a valve needle 14 axially movable along longitudinal valve axis 10. Valve sleeve 6 extends in the axial direction approximately over one-half of the total axial length of the fuel injector, for example.

In addition to core 2 and valve needle 14, a valve needle 15, which is attached to valve sleeve 6 by a weld 8, for example, is also situated in opening 11. Valve seat body 15 has a fixed valve seat surface 16 as a valve seat. Valve needle 14 is formed, for example, by a tubular armature 17, an also tubular needle section 18, and a spherical valve closing body 19, valve closing body 19 being fixedly attached to needle section 18 by a weld. On the downstream face of valve seat body 15, a spray hole disk 21, which is pot-shaped, for example, is situated, whose bent, peripheral holding edge 20 is directed upward against the flow direction. Valve seat body 15 is fixedly attached to spray hole disk 21 by a circumferential, airtight weld. One or more transverse openings 22 are provided in needle section 18 of valve needle 14, so that the fuel flowing through armature 17 in an internal longitudinal bore hole 23 may exit and flow along valve closing body 19, for example, flats 24 to valve seat surface 16.

The injector is actuated electromagnetically in the known manner. The electromagnetic circuit having solenoid 1, internal core 2, outer valve jacket 5, and armature 17 is used for axially moving valve needle 14 and thus for opening the injector against the spring force of a restoring spring 25 which engages valve needle 14 or for closing the injector. The end of armature 17 facing away from valve closing body 19 is oriented toward core 2. Instead of core 2, a cover part, which closes the magnetic circuit and is used as an internal pole, may also be provided, for example.

Spherical valve closing body 19 cooperates with valve seat surface 16 of valve seat body 15, which is formed in valve seat body 15 downstream from a guide opening in the axial direction and conically tapers in the direction of flow. Spray hole disk 21 has at least one, for example four, spray opening(s) 27 made by erosion, laser drilling, or punching.

The depth of insertion of core 2 in the injector determines, among other factors, the lift of valve needle 14. One end position of valve needle 14 when solenoid 1 is not excited is determined by valve closing body 19 resting on valve seat surface 16 of valve seat body 15, while the other end position of valve needle 14 when solenoid 1 is excited results from armature 17 resting on the downstream core end. The lift is set by an axial shift of core 2, which is then fixedly attached to valve sleeve 6 according to the desired position.

In addition to restoring spring 25, an adjusting element in the form of an adjusting sleeve 29 is inserted into a flow bore hole 28 of core 2, running concentrically to longitudinal valve axis 10 and used for supplying fuel in the direction of valve seat surface 16. Adjusting sleeve 29 is used for adjusting the spring pre-tension of restoring spring 25 resting on adjusting sleeve 29, whose opposite side is in turn in contact with valve needle 14 in the area of armature 17, the dynamic injection quantity also being adjusted using adjusting sleeve 29. A fuel filter 32 is situated above adjusting sleeve 29 in valve sleeve 6.

The inlet side end of the injector is formed by a metallic fuel inlet nozzle 41, which is surrounded by an extruded plastic sheath 42, which stabilizes, protects, and surrounds it. A flow bore hole 43 of a tube 44 of fuel inlet nozzle 41, running concentrically to longitudinal valve axis 10, is used as a fuel inlet. Extruded plastic sheath 42 is extruded, for example, in such a way that the plastic directly surrounds parts of valve sleeve 6 and valve jacket 5.

Reliable sealing is thus achieved, for example, via a labyrinth seal 46 on the periphery of valve jacket 5. An electrical plug 56 is also sheathed by extruded plastic sheath 42.

Figure 2:
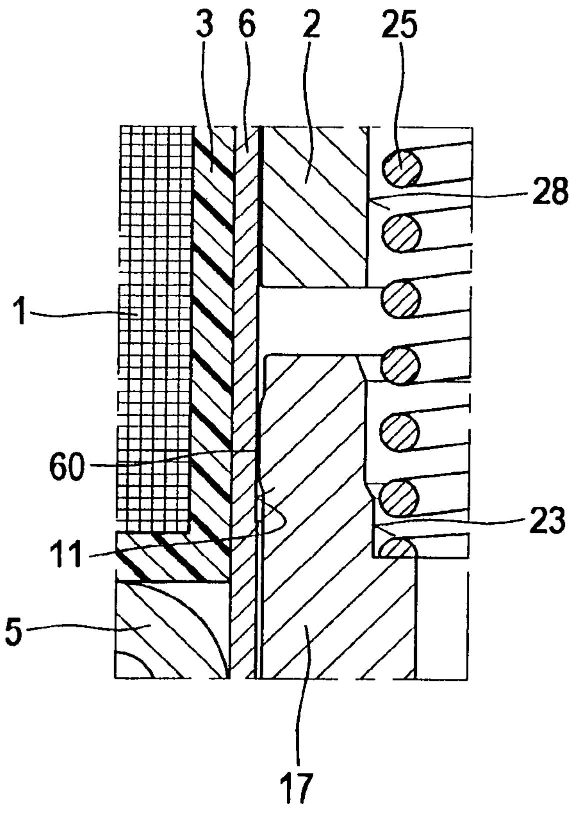
FIG. 2 Prior Art
FIG. 2 shows a partial view II of FIG. 1 of the known fuel injector according to the related art, indicating the area that is relevant to the present invention.

FIG. 2 shows a partial view II of FIG. 1 of the known fuel injector according to the related art, indicating the area according to the present invention. The guide zone of armature 17 is apparent in particular. On the outermost periphery, movable armature 17 has, as is known, a circumferential guide band 60 or multiple knob-shaped or lug-shaped guide bands 60 distributed over the periphery for guiding it in valve sleeve 6 reliably and without tilting. Conversely, guide band 60 or guide bands 60 may also be molded on valve sleeve 6, in which case the outer periphery of armature 17 has a cylindrical design and a constant diameter. Accordingly, restoring spring 25 has a considerable clearance to the wall of flow bore hole 28 in core 2 or to the wall of longitudinal bore hole 23 in armature 17.

Figure 3:
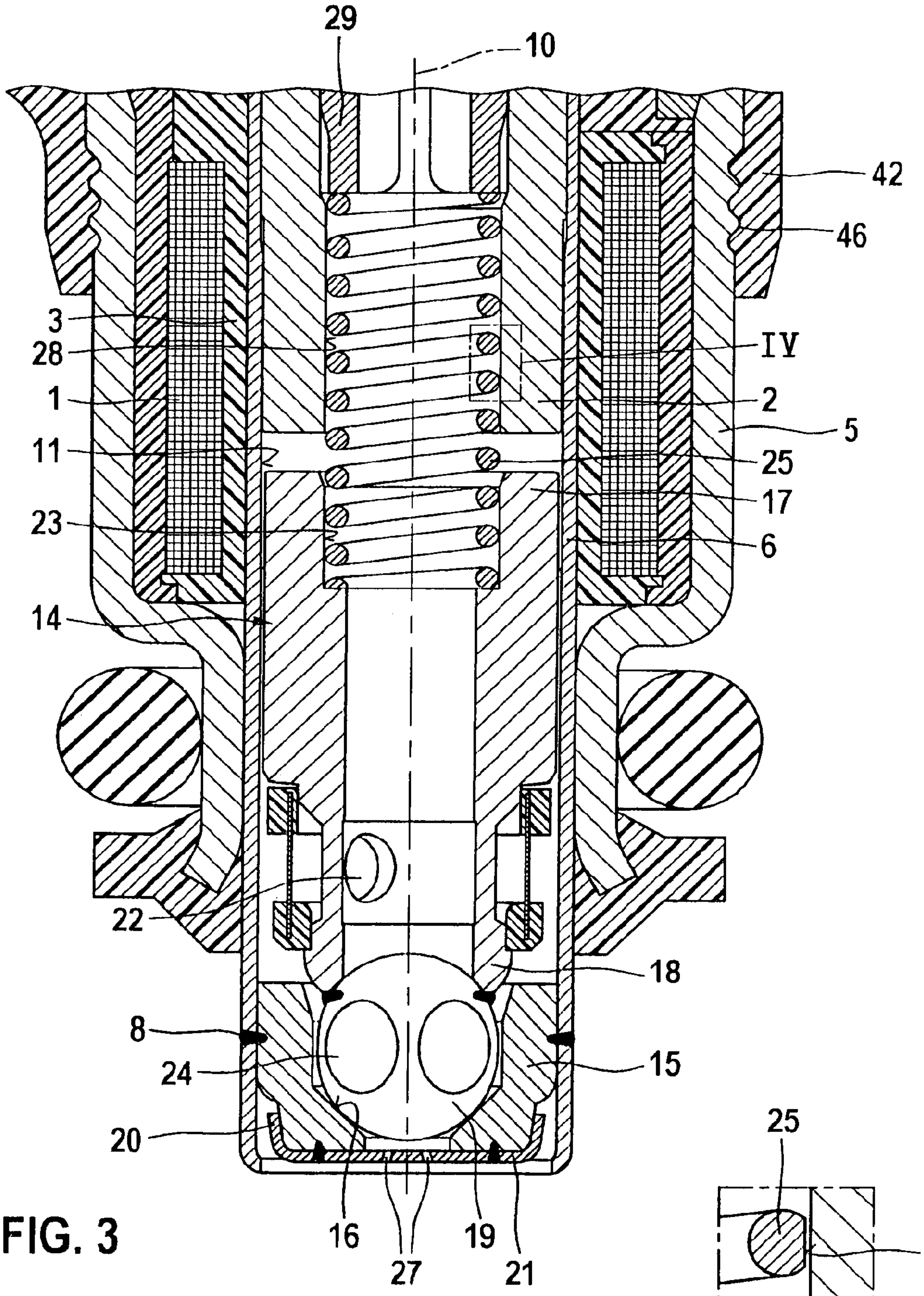
FIG. 3 shows a partial view of a valve according to the present invention.

FIG. 3 shows a partial view of a valve according to the present invention in which the guidance of armature 17 is displaced from its outer periphery inward into longitudinal bore hole 23. According to the present invention, armature 17 is guided on restoring spring 25 during its axial longitudinal movement. For this purpose, restoring spring 25 is fitted very precisely into flow bore hole 28 of core 2 and longitudinal bore hole 23 of armature 17, so that restoring spring 25, in addition to its actual function of restoring valve needle 14, also assumes the function of guiding armature 17, whereby a function integration is implemented in a simple manner. Longitudinal bore hole 23 of armature 17 represents the actual guide bore hole, since it moves along restoring spring 25. Both flow bore hole 28 of core 2 and longitudinal bore hole 23 of armature 17 may be brought to their exact dimension in a cost-effective manner by reaming. Ideally, both bore holes 23, 28 have exactly the same inner diameters. Restoring spring 25 is manufactured from a hard, wear-resistant wire, which usually has a circular cross section as FIG. 3 shows.

Figure 4:
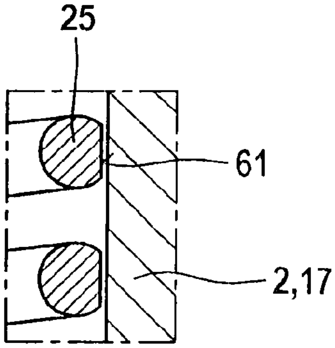
FIG. 4 shows a detail IV in FIG. 3 as a partial view of a restoring spring designed according to the present invention.

However, it is also conceivable to modify restoring spring 25, responsible for the guiding function, on its outer guiding periphery. FIG. 4 shows a detail IV in FIG. 3 as a partial view of a restoring spring 25 configured according to the present invention, which has a flattened outer periphery. Outer flats 61 may be formed, for example, only on the spring spires in the area of longitudinal bore hole 23 of armature 17, but they may also run over the entire length of restoring spring 25. Flats 61 are applied, for example, by grinding, in particular via centerless grinding, which may be performed at a very low cost and with high accuracy.

What is claimed is:

1. An electromagnetically actuatable valve, comprising:

a valve seat body having a valve seat surface;

a valve closing body configured to cooperate with the valve seat surface on the valve seat body;

an excitable actuator in the form of an electromagnetic circuit including a solenoid, an internal pole, an external magnetic circuit component and a movable armature, wherein the movable armature is configured to operate the valve closing body; and a restoring spring configured to restore the valve closing body to a resting position on the valve seat surface, wherein the restoring spring and an internal longitudinal bore hole of the movable armature are operatively paired such that axial movement of the movable armature is guided only along the restoring spring, wherein a plurality of turns of the restoring spring is inserted into the internal longitudinal bore hole of the movable armature.

2. The electromagnetically actuatable valve as recited in claim 1, wherein the restoring spring is positioned in an internal flow bore hole of the internal pole.

3. The electromagnetically actuatable valve as recited in claim 2, wherein the internal flow bore hole of the internal pole and the internal longitudinal bore hole of the movable armature have the same inner diameter.

4. The electromagnetically actuatable valve as recited in claim 3, wherein the dimensions of the internal flow bore hole of the internal pole and the internal longitudinal bore hole of the movable armature are achieved by reaming.

5. The electromagnetically actuatable valve as recited in claim 3, wherein the restoring spring is formed from a wear-resistant wire having a circular cross section.

6. The electromagnetically actuatable valve as recited in claim 5, wherein at least a portion of the radial outer periphery of the restoring spring is flattened.

7. The electromagnetically actuatable valve as recited in claim 6, wherein the entire radial outer periphery of the restoring spring is flattened.

8. The electromagnetically actuatable valve as recited in claim 7, wherein the radial outer periphery of the restoring spring is flattened by grinding.

9. The electromagnetically actuatable valve as recited in claim 7, wherein the outer periphery of the movable armature is free of guide bands.

* * * * *

UNITED STATES PATENT AND TRADEMARK OFFICE

CERTIFICATE OF CORRECTION

PATENT NO. : 8,646,749 B2
APPLICATION NO. : 12/734204
DATED : February 11, 2014
INVENTOR(S) : Ferdinand Reiter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Twenty-ninth Day of September, 2015

Michelle K. Lee
*Director of the United States Patent and Trademark Office*